(12) United States Patent
Bock et al.

(10) Patent No.: US 7,721,915 B2
(45) Date of Patent: May 25, 2010

(54) HYBRID INFLATOR WITH TEMPORARY GAS GENERATOR THROTTLE

(75) Inventors: Christopher J. Bock, Phoenix, AZ (US); Gregory L. Wiebers, Mesa, AZ (US)

(73) Assignee: Goodrich Corporation, Charlotte, NC (US)

( * ) Notice: Subject to any disclaimer, the term of this patent is extended or adjusted under 35 U.S.C. 154(b) by 637 days.

(21) Appl. No.: 11/734,193

(22) Filed: Apr. 11, 2007

(65) Prior Publication Data

US 2008/0251348 A1 Oct. 16, 2008

(51) Int. Cl.
*B67D 7/00* (2010.01)

(52) U.S. Cl. ........ 222/3; 222/1; 222/5; 137/68.13; 137/68.23; 280/736; 280/737; 280/741; 280/742

(58) Field of Classification Search ........ 222/1, 222/3, 5; 280/735–742; 137/68.13, 71, 68.14, 137/68.19, 68.23; 102/266, 268, 530–531, 102/276
See application file for complete search history.

(56) References Cited

U.S. PATENT DOCUMENTS

| | | | | |
|---|---|---|---|---|
| 5,290,060 A | * | 3/1994 | Smith | 280/737 |
| 5,664,802 A | * | 9/1997 | Harris et al. | 280/736 |
| 5,988,438 A | * | 11/1999 | Lewis et al. | 222/3 |
| 6,068,289 A | | 5/2000 | Bosio | |
| 6,799,776 B2 | | 10/2004 | Yamazaki | |
| 7,032,778 B2 | * | 4/2006 | Bock et al. | 222/3 |

FOREIGN PATENT DOCUMENTS

DE 296 17 587 U1 6/1997
EP 1 442 978 A1 8/2004

OTHER PUBLICATIONS

XP 000680925 39126, Air Bag Inflator Having a Variable Area Gas Exit Orifice (3 pgs.), Nov. 1996.

* cited by examiner

*Primary Examiner*—Frederick C. Nicolas
(74) *Attorney, Agent, or Firm*—Jerry J. Holden; John D. Titus

(57) ABSTRACT

A dual stage hybrid inflation device includes a first stage gas source including a liquefied gas stored in a first stage pressure vessel and a second stage gas source including a gas generator having a gas output directed into the first stage pressure vessel. The gas generator is isolated from the first stage pressure vessel by a frangible diaphragm that ruptures when the pressure in the gas generator exceeds the pressure in the first stage pressure vessel by a predetermined amount. The gas generator is also isolated from the first stage pressure vessel by an eroding nozzle that temporarily restricts the flow of gas from the gas generator to the first stage pressure vessel after the frangible diaphragm ruptures. The eroding nozzle initially restricts the flow of gas from the gas generator to the first stage pressure vessel to prevent a sudden pressure drop in the gas generator that would cause the pyrotechnic gas generating material to self extinguish. The nozzle then erodes away to allow an unrestricted flow of combustion products from the gas generator to the first stage pressure vessel.

13 Claims, 3 Drawing Sheets

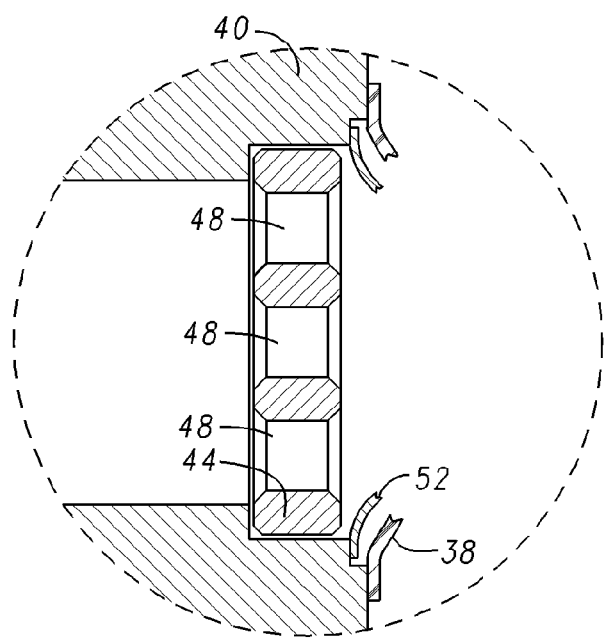
*FIG. 6*
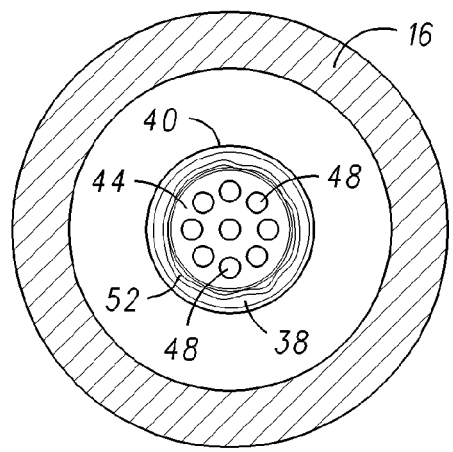
*FIG. 7*
*FIG. 8*
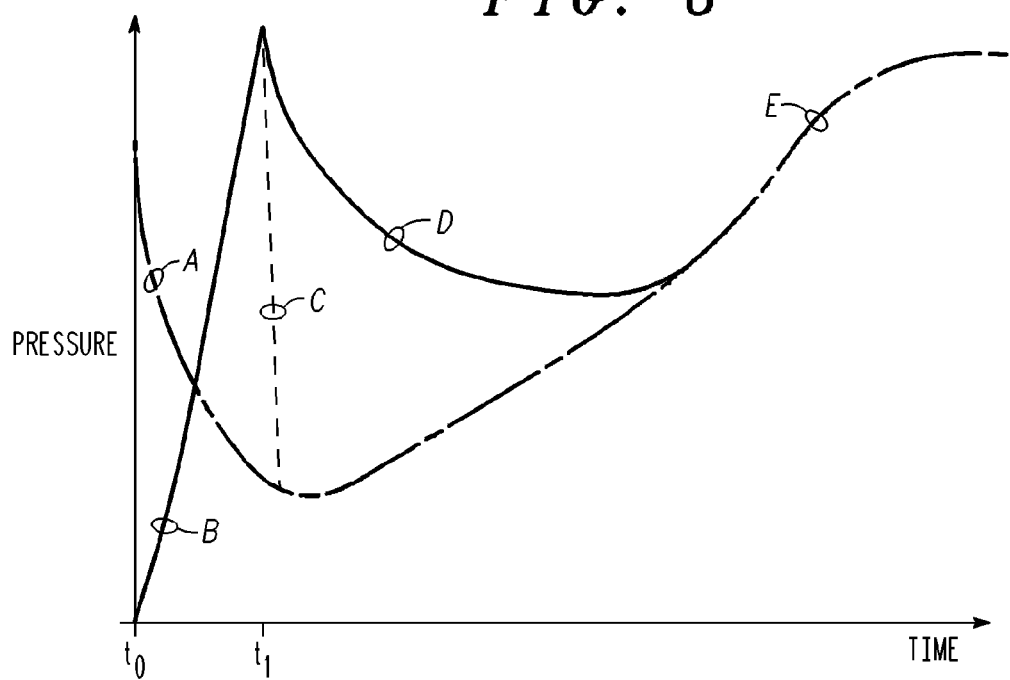

HYBRID INFLATOR WITH TEMPORARY GAS GENERATOR THROTTLE

BACKGROUND OF THE INVENTION

This invention relates to emergency evacuation equipment for aircraft, in particular to an inflation device for inflating an inflatable aircraft evacuation slide or other inflatable device.

The requirement for reliably evacuating airline passengers in the event of an emergency is well known. Emergencies at take-off and landing often demand swift removal of passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide.

Current state of the art emergency evacuation slide systems comprise an inflatable evacuation slide that is stored in a folded, uninflated state together with a source of inflation gas. The source of inflation gas typically comprises a gas generator, stored compressed gas, or a combination thereof. Pyrotechnic gas generators have an advantage in that they are small, lightweight, and produce a high volume of gas, however, the high temperature gas produced by a gas generator alone can cause numerous problems including sagging of the evacuation slide as the inflation gas cools and, in some cases melting or scorching of the fabric out of which the inflation slide is fabricated. Use of stored compressed gas by itself, although simple, implicates a weight penalty that must be paid for carrying a pressure vessel having sufficient capacity (in terms of volume and pressure) to inflate the evacuation slide over the wide operational temperature range specified for such slides. Additionally, where only a compressed gas is used to inflate the evacuation slide, a large drop in temperature occurs as the gases expand, often causing ice to form, which can block the flow of gas. These problems are further exacerbated by the extreme temperature range over which these inflation systems are required to operate, typically from −65° F. to +165° F.

Accordingly, state of the art emergency evacuation slide systems typically comprise a hybrid inflator, which utilizes a pyrotechnic gas generator in combination with a stored mixture of compressed and liquefied gases, typically a mixture of about 15% compressed Nitrogen or Argon together with about 85% Carbon Dioxide primarily in liquid form. The pyrotechnic gas generator is stored in a separate pressure vessel that is isolated from the stored gas by a frangible diaphragm. Upon initiation of the inflator, the pyrotechnic gas generator is ignited and pressure builds until the frangible diaphragm ruptures allowing the hot combustion products to flow from the gas generator compartment into the stored gas pressure vessel. The gas generator provides heat to vaporize the liquid Carbon Dioxide as well as providing additional gaseous combustion products. The liquid Carbon Dioxide absorbs heat from the gas generator so that the inflator output is reduced in temperature and therefore the inflatable device is less prone to sagging after inflation.

Use of a significant portion of liquefied gas provides great advantages in terms of the ratio of the volume of gas produced to the volume of stored liquid. Even better ratios could be obtained, however, if the percentage of liquefied Carbon Dioxide could be increased. Unfortunately, at very low temperatures, the vapor pressure of Carbon Dioxide is too low (less than 200 psia at −65° F.) to enable combustion of the pyrotechnic materials used in modern hybrid inflators. Accordingly, a minimum of about 15% Nitrogen, Argon or other gas that remains gaseous at −65° F. must be included so that a minimum pressure of about 1200 psi is maintained in the pressure vessel so that when the burst diaphragm between the gas generator and the stored gas pressure vessel ruptures, the sudden loss of pressure in the gas generator does not cause the pyrotechnic material to self-extinguish.

Accordingly, what is needed is a hybrid inflator that temporarily throttles the gas flow from the gas generator to the stored gas pressure vessel so that pressure within the gas generator is maintained irrespective of the pressure in the stored gas pressure vessel. Use of such a temporary throttle will enable a higher percentage of liquefied Carbon Dioxide to be used, resulting in a smaller pressure vessel with the concomitant reduction in weight and volume of the inflator system.

SUMMARY OF THE INVENTION

The present invention comprises a dual stage hybrid inflation device including a first stage gas source comprising a liquefied gas stored in a first stage pressure vessel and a second stage gas source comprising a gas generator having a gas output directed into the first stage pressure vessel. According to an embodiment of the present invention, the gas generator is isolated from the first stage pressure vessel by a frangible diaphragm that ruptures when the pressure in the gas generator exceeds the pressure in the first stage pressure vessel by a predetermined amount. The gas generator is also isolated from the first stage pressure vessel by an eroding nozzle that temporarily restricts the flow of gas from the gas generator to the first stage pressure vessel after the frangible diaphragm ruptures. The eroding nozzle initially restricts the flow of gas from the gas generator to the first stage pressure vessel to prevent a sudden pressure drop in the gas generator that would cause the pyrotechnic gas generating material to self extinguish. The nozzle then erodes away to allow an unobstructed flow of combustion products from the gas generator to the first stage pressure vessel, thereby maximizing the rate of heat transfer from the gas generator to the first stage pressure vessel. Because the pressure inside the gas generator is initially regulated by the flow restriction provided by the eroding nozzle, a higher percentage of liquefied carbon dioxide can be used as the stored inflation gas despite the very low vapor pressure of carbon dioxide at low temperatures.

BRIEF DESCRIPTION OF THE DRAWING

FIG. 6 is the cross-sectional view of FIG. 4 at a later time.

FIG. 7 is an end view of the portion of the inflator depicted in FIG. 6; and

FIG. 8 is a pressure versus time diagram of an inflator incorporating features of the present invention.

DETAILED DESCRIPTION

Figure 1:
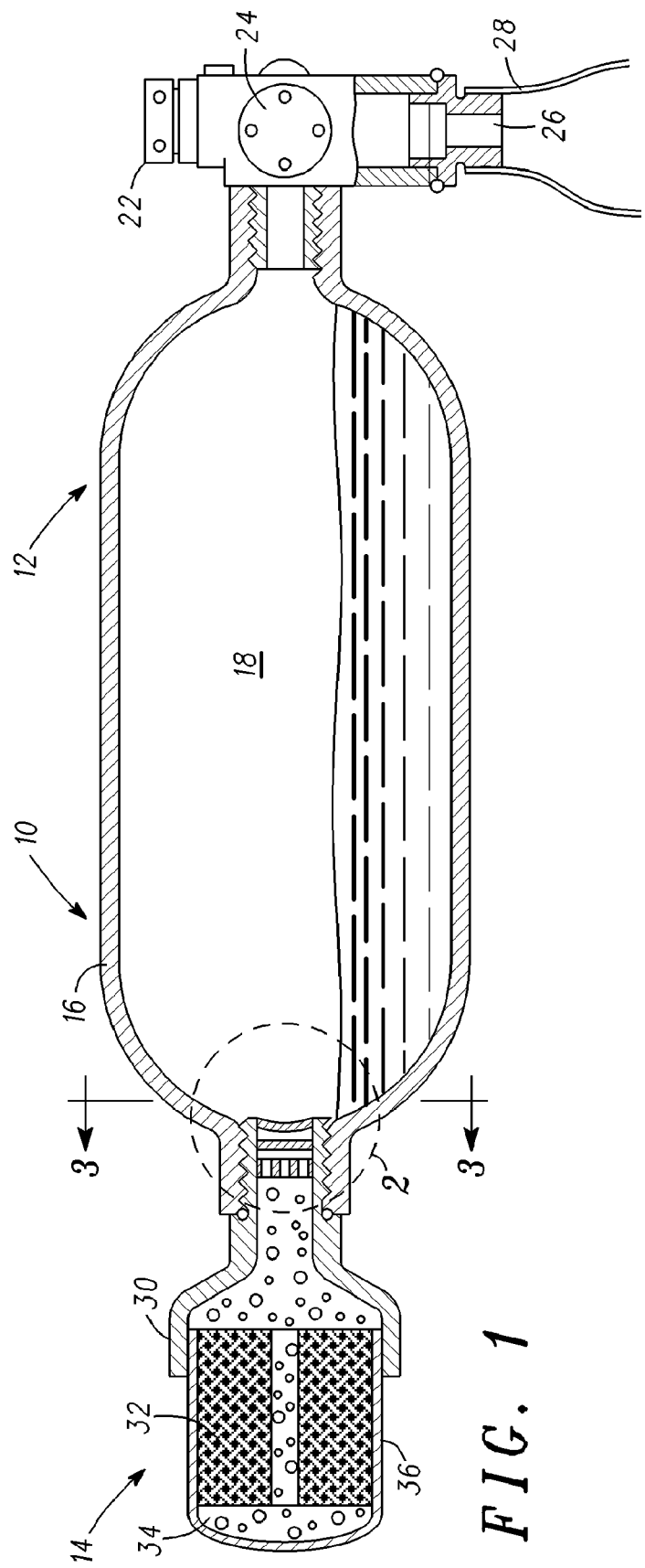
FIG. 1 is a cross-sectional view of an inflator incorporating features of the present invention.

The drawing figures are intended to illustrate to the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

The present invention is directed to a method and apparatus for inflating an inflatable device such as an aircraft emergency evacuation slide over a wide range of operating temperatures, typically −65° F. to +165° F. With reference to the drawing figures, a cross-sectional view of an inflator incorporating features of the present invention is shown in FIG. 1. Inflator 10 comprises a first stage gas source 12 and a second stage gas source 14. First stage gas source 12 comprises a pressure vessel 16 containing a mixture of compressed inflation gases 18. In the illustrative example, inflation gas mixture 18 comprises a mixture of carbon dioxide and nitrogen or argon in which the carbon dioxide makes up at least 85% of the mixture by weight, preferably at least 90% of the mixture by weight and most preferably at least 95% of the mixture by weight. Because carbon dioxide liquefies at ambient temperatures at a relatively modest pressure, depending on the ambient temperature, some or all of the carbon dioxide component of inflation gas mixture 18 will be in a liquid state. Because the carbon dioxide is in a liquid state, pressure vessel 16 is substantially smaller and, therefore, substantially lighter than pressure vessels of current state of the art inflators.

Pressure vessel 16 has a gas exit opening 20 to which is attached a regulator valve 22. Regulator valve 22 is normally closed but is remotely actuated via an input terminal 24 which is adapted to receive a voltage signal that opens regulator valve 22 in a conventional manner. Regulator valve 22 is in fluid communication with an output duct 26 leading to the inflatable device 28, shown schematically in FIG. 1.

Second stage gas source 14 comprises a pyrotechnic gas generator 30 comprising a pyrotechnic gas generating material 32 alone or in combination with a compressed gas 34 (such as disclosed in U.S. Pat. No. 5,988,438 to Lewis et al. and assigned to the assignee of the present invention) contained within a gas generator housing 36. Pyrotechnic gas generating material 32 may be any conventional gas generator material such as sodium-azide or lithium-azide coupled with an oxidator such as sodium nitrate, potassium nitrate, potassium perchlorate and the like but preferably comprises ammonium nitrate in combination with a secondary explosive such as cyclotrimethylene trinitramine (RDX), cyclotetramethylene tetranitramine (HMX), pentaerythritol tetranitrate (PETN), hexanitrohexaazaisowurtzitane (CL-20) or similar energizers that produce a high-volume of gaseous combustion products with little or no particulates. A most preferred gas generator material is UPCO 8043, which is a slow burning, relatively insensitive ammonium nitrate-based propellant available from Universal Propulsion Company, Inc. of Phoenix, Ariz. UPCO 8043 is preferred not only because it is relatively insensitive to heat and shock but also is preferred because it will not burn effectively below approximately 1000 psi and therefore is very safe to handle and store. Pyrotechnic gas generating material 32 is initiated by a conventional initiation composition such as a mixture of zirconium or titanium with potassium perchlorate, borum calcium chromate, lead styphnate or similar primary explosives suitable for use in hot-wire electroexplosive devices.

Figure 2:
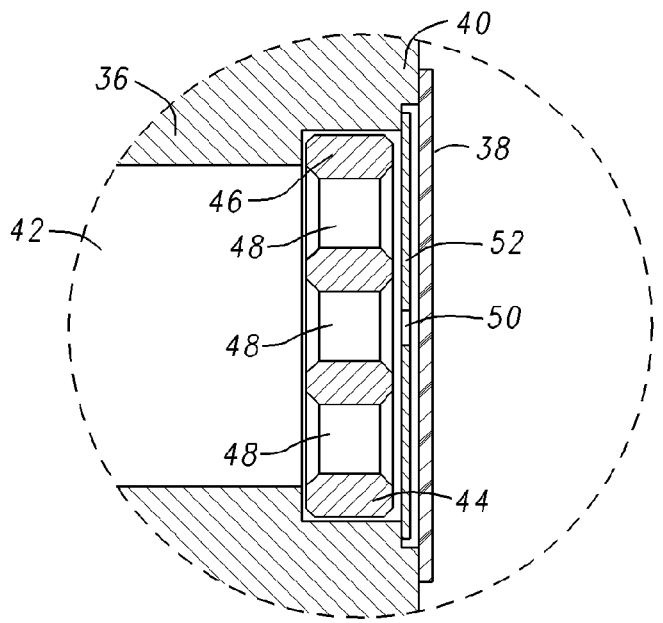
FIG. 2 is an enlarged view of a portion of FIG. 1.
Figure 3:
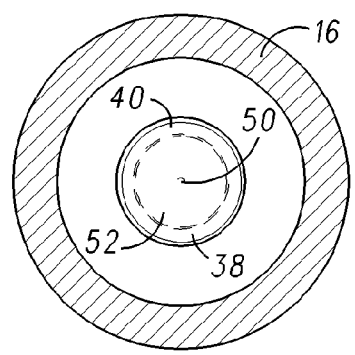
FIG. 3 is a cross-sectional view of the inflator of FIG. 1 taken along line 3-3.
Figure 4:
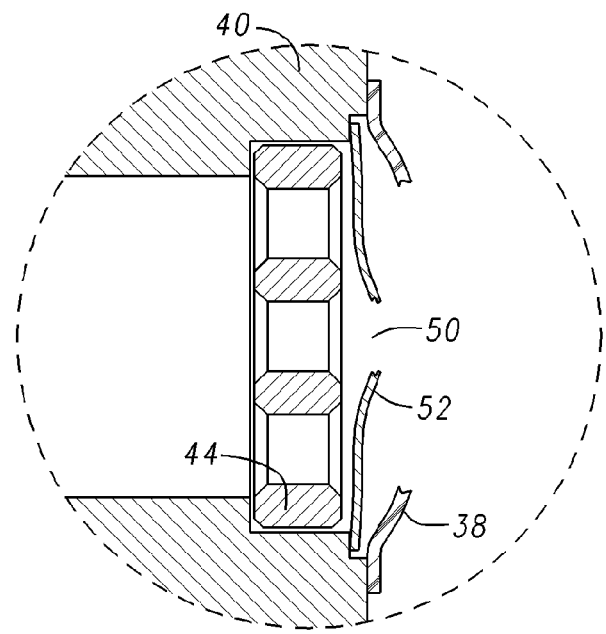
FIG. 4 is a cross-sectional view of a portion of the inflator shortly after the frangible diaphragm has ruptured.
Figure 5:
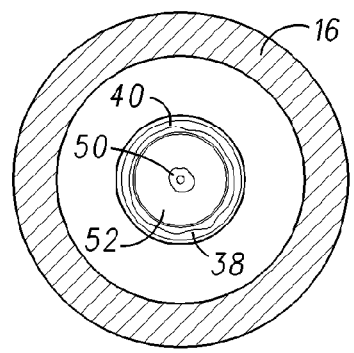
FIG. 5 is an end view of the portion of the inflator depicted in FIG. 4.

With additional reference to FIG. 2 pyrotechnic gas generator 30 is isolated from pressure vessel 16 by a frangible burst disc 38 that is welded to the neck 40 of gas generator housing 36. Burst disc 38 may be made of any conventional frangible material but in the illustrative embodiment comprises a disc made of corrosion resistant steel on the order of 0.010 inches thick. Burst disc 38 hermetically seals the gas output opening 42 of pyrotechnic gas generator 30 from pressure vessel 16. Burst disc 38 is designed to rupture when the pressure in pyrotechnic gas generator 30 exceeds the pressure in pressure vessel 16 by a predetermined amount, typically about 1000 psi differential pressure. Since the interior pressure of pressure vessel 18 varies from approximately 300 psi at −65° F. to 4500 psi at +165° F., burst disc 38 must be supported by a disc support plate 44 which prevents burst disc 38 from rupturing when the pressure in pressure vessel 16 substantially exceeds the pressure in pyrotechnic gas generator 30 during storage. Disc support plate 44 comprises a disc-shaped housing 46 having a plurality of fixed nozzles 48 formed therein. Fixed nozzles 48 are large enough that gases flowing from pyrotechnic gas generator 30 into pressure vessel 16 flow without substantial resistance, but are sufficiently small to prevent burst disc 38 from rupturing when the pressure in pressure vessel 16 exceeds the pressure in pyrotechnic gas generator 30.

A throttle disc 52 is also welded to neck 40 between burst disc 38 and disc support plate 44. In the illustrative embodiment, throttle disc 52 comprises a disc-shaped sheet of 300 series stainless steel approximately 0.010 inches thick with a single eroding nozzle 50. In the illustrative embodiment, eroding nozzle 50 comprises an orifice approximately 0.100 inch in diameter formed in throttle disc 52, however other eroding nozzles may be advantageously used in accordance with the teachings of the present invention and therefore are considered within the scope of the invention.

In operation, upon an initiation event, such as the opening of an aircraft emergency exit in the "armed" position, a voltage signal is transmitted to input terminal 24 of regulator valve 22. The signal received at input terminal 24 of regulator valve 22 causes regulator valve to open immediately, beginning the flow of inflation gas mixture 18 through output duct 26 into inflatable device 28. Accordingly, as shown in FIG. 8 at line "A," the pressure in pressure vessel 16 begins to drop as inflation gases pass through regulator valve 22 into inflatable device 28. Simultaneously, a firing signal initiates pyrotechnic gas generator material 32 which begins to burn, thereby increasing the pressure within pyrotechnic gas generator 30. As shown in FIG. 8 at line "B," the pressure in pyrotechnic gas generator 30 rises rapidly until at time $t_1$ burst disc 38 ruptures allowing the high-pressure combustion products to flow from pyrotechnic gas generator 30 into pressure vessel 16. Were it not for the presence of eroding nozzle 50, the rupturing of burst disc 38 would cause the pressure in pyrotechnic gas generator 30 to drop precipitously as shown in FIG. 8 line "C." This precipitous drop in pressure would cause the UPCO 8043 gas generator material to self-extinguish at cold temperatures when the pressure in pressure vessel 16 is below about 1000 psi.

The presence of eroding nozzle 50, however, throttles the flow of high pressure gases from pyrotechnic gas generator 30 into pressure vessel 16 as shown in FIG. 8 line "D." Because the rate of pressure drop within pyrotechnic gas generator 30 is mitigated by eroding nozzle 50, the pyrotechnic gas generator material 32 does not self-extinguish and, therefore, continues add hot combustion byproducts to the gas mixture 18 stored in pressure vessel 16.

As the hot combustion products from pyrotechnic gas generator 30 flow through eroding nozzle 50, throttle disc 52 is heated, which weakens throttle disc 52 and allows eroding nozzle 50 to erode away. As eroding nozzle 50 erodes away, it provides less and less restriction to the flow of combustion products from pyrotechnic gas generator 30 to pressure vessel 16, however, the pressure in pressure vessel 16 is increasing as a result of the vaporization of the liquid carbon dioxide stored in pressure vessel 16. Accordingly, the restriction is no longer necessary to prevent a precipitous drop of pressure in the gas generator 30 and, therefore, allowing the full unobstructed flow of hot combustion products from pyrotechnic gas generator 30 into pressure vessel 16 maximizes the pressure and flow of inflation gases into inflatable device 28 while maintaining the pressure within pressure vessel 16 below the maximum operating pressure of 4500 psi as shown in FIG. 8 line "E."

Although certain illustrative embodiments and methods have been disclosed herein, it will be apparent from the foregoing disclosure to those skilled in the art that variations and modifications of such embodiments and methods may be made without departing from the spirit and scope of the invention. For example, eroding nozzles other than an orifice such as eroding nozzles made from an ablative material well known in the gas generator and solid rocket fields could be interposed between the disc support plate and the burst disc in accordance with the teachings of the present invention. Accordingly, it is intended that the invention shall be limited only to the extent required by the appended claims and the rules and principles of applicable law.

What is claimed is:

1. An apparatus for inflating an inflatable device comprising:
    a first stage gas source comprising a first stage pressure vessel having an interior volume and a gas exit opening, a pressurized cold gas stored within the interior volume of said first stage pressure vessel, and a remotely actuated valve in fluid communication with said gas exit opening, said remotely actuated valve being responsive to an external signal for opening to provide a gas flow path between said first stage pressure vessel and said inflatable device;
    a second stage gas source comprising a second stage pressure vessel having an interior volume and a gas output opening directed into said first stage pressure vessel, said second stage gas source further comprising a pyrotechnic gas generating material disposed in the interior volume of said second stage pressure vessel, said pyrotechnic gas generating material being capable of combusting to form a gaseous combustion product;
    a frangible diaphragm disposed in said gas output opening of said second stage pressure vessel for separating the interior volume of said second stage pressure vessel from the interior volume of said first stage pressure vessel, said frangible diaphragm being rupturable to provide a gas flow path between said second stage pressure vessel and said first stage pressure vessel; and
    an eroding nozzle disposed in said gas output opening of said second stage pressure vessel, said eroding nozzle providing a flow restriction that decreases in resistance as said gaseous combustion products pass through said eroding nozzle.

2. The apparatus of claim 1, wherein:
    said eroding nozzle comprises a plate member with an orifice formed therein.

3. The apparatus of claim 1, further comprising:
    a disc support plate disposed in said gas output opening, said disc support plate having a plurality of non-eroding nozzles in a gas flow path from the interior volume of said second stage pressure vessel to the interior volume of said first stage pressure vessel.

4. The apparatus of claim 1, wherein:
    said pyrotechnic gas generating material has a critical pressure of at least 1000 psi.

5. The apparatus of claim 1, wherein:
    said pressurized cold gas comprises a mixture of gases including carbon dioxide and a second gas selected from the group consisting of nitrogen and argon wherein at least a portion of the carbon dioxide is stored in a liquid state.

6. The apparatus of claim 5, wherein:
    said mixture of gases comprises at least 85% Carbon Dioxide by weight.

7. The apparatus of claim 5, wherein:
    said mixture of gases comprises at least 90% Carbon Dioxide by weight.

8. The apparatus of claim 5, wherein:
    said mixture of gases comprises at least 95% Carbon Dioxide by weight.

9. The apparatus of claim 1, wherein:
    said inflatable device is an inflatable aircraft evacuation slide.

10. A method of inflating an inflatable device, comprising:
    providing a first stage gas source comprising a first stage pressure vessel having an interior volume and a gas exit opening, a pressurized cold gas stored within the interior volume of said first stage pressure vessel, and a remotely actuated valve in fluid communication with said gas exit opening, said remotely actuated valve being responsive to an external signal for opening to provide a gas flow path between said first stage pressure vessel and said inflatable device;
    providing a second stage gas source comprising a second stage pressure vessel having an interior volume and a gas output opening directed into said first stage pressure vessel, the interior volume of said second stage pressure vessel being separated from the interior volume of said first stage pressure vessel by a frangible diaphragm and an eroding nozzle having a predetermined flow area, said second stage gas source further comprising a pyrotechnic gas generating material disposed in the interior volume of said second stage pressure vessel, said pyrotechnic gas generating material being capable of combusting to form a gaseous combustion product;
    opening said remotely actuated valve to begin a flow of gas from said first stage pressure vessel to said inflatable device;
    initiating said pyrotechnic gas generating material to cause pressure to increase in said second stage pressure vessel until said frangible diaphragm ruptures and said gaseous combustion product begins to flow through said eroding nozzle into said first stage pressure vessel; and
    temporarily throttling said flow of gaseous combustion product through said eroding nozzle so as to reduce the rate of pressure drop within said second stage pressure vessel;
    whereby said pyrotechnic gas generating material does not self extinguish due to a sudden drop in pressure within the interior volume of said second stage pressure vessel.

11. The method of claim 10 further comprising;
    eroding said eroding nozzle to enlarge said predetermined flow area as said gaseous combustion product passes therethrough.

12. The method of claim 11, wherein:
    said eroding nozzle comprises a plate member with an orifice formed therein.

13. A method of inflating an inflatable device, comprising:
providing a first stage gas source comprising a first stage pressure vessel having an interior volume and a gas exit opening, a pressurized cold gas stored within the interior volume of said first stage pressure vessel, and a remotely actuated valve in fluid communication with said gas exit opening, said remotely actuated valve being responsive to an external signal for opening to provide a gas flow path between said first stage pressure vessel and said inflatable device;

providing a second stage gas source comprising a second stage pressure vessel having an interior volume and a gas output opening directed into said first stage pressure vessel, the interior volume of said second stage pressure vessel being separated from the interior volume of said first stage pressure vessel by a frangible diaphragm, said second stage gas source further comprising a pyrotechnic gas generating material disposed in the interior volume of said second stage pressure vessel, said pyrotechnic gas generating material being capable of combusting to form a gaseous combustion product;

opening said remotely actuated valve to begin a flow of gas from said first stage pressure vessel to said inflatable device;

initiating said pyrotechnic gas generating material to cause pressure to increase in said second stage pressure vessel until said frangible diaphragm ruptures and said gaseous combustion product begins to flow through said gas output opening into said first stage pressure vessel; and temporarily throttling said flow of gaseous combustion product through said gas output opening so as to reduce the rate of pressure drop within said second stage pressure vessel;

whereby said pyrotechnic gas generating material does not self extinguish due to a sudden drop in pressure within the interior volume of said second stage pressure vessel.

* * * * *